United States Patent [19]
Holz et al.

[11] Patent Number: 5,575,882
[45] Date of Patent: Nov. 19, 1996

[54] PROCESS FOR THE MANUFACTURE OF COMPOSITES

[75] Inventors: Karl-Heinz Holz, Frankfurt am Main; Johannes Luke, Königstein/Taunus; Wolfgang Riederer, Hofheim am Taunus, all of Germany

[73] Assignee: Hoechst Aktiengesellschaft, Germany

[21] Appl. No.: 700,341

[22] Filed: May 7, 1991

Related U.S. Application Data

[63] Continuation of Ser. No. 481,874, Feb. 20, 1990, abandoned.

[30] Foreign Application Priority Data

Feb. 22, 1989 [DE] Germany .................... 39 05 404.7

[51] Int. Cl.⁶ .................................................. C09J 5/02
[52] U.S. Cl. ................. 156/308.6; 156/87; 156/314; 156/319; 156/330; 428/116

[58] Field of Search ...................... 156/87, 314, 319, 156/308.6, 330; 428/116

[56] References Cited

U.S. PATENT DOCUMENTS

| 3,530,032 | 9/1970 | Ragir ....................................... 156/330 |
| 4,249,976 | 2/1981 | Hudson ................................... 428/116 |

FOREIGN PATENT DOCUMENTS 63-72305  4/1988  Japan .................................. 156/306.6

*Primary Examiner*—John J. Gallagher
*Attorney, Agent, or Firm*—Connolly & Hutz

[57] ABSTRACT

The invention relates to a process for the manufacture of composites from cores and facings with a liquid and/or pasty adhesive. The core is wetted with a liquid which also serves as a solvent and/or wetting agent for the adhesive.

8 Claims, No Drawings

PROCESS FOR THE MANUFACTURE OF COMPOSITES

This application is a continuation of our application Ser. No. 07/481,874, filed Feb. 20, 1990 and now abandoned.

The present invention relates to an improved process for the manufacture of composites from cores and facings by bonding the cores to the facings with a liquid and/or pasty adhesive.

The use of lightweight building materials is a constant challenge in many engineering constructions. In addition to reducing weight and saving materials, it is also desirable to improve the function of the composites while at the same time ensuring their stability and strength. Lightweight building materials are known from "Hoechst High Chem Magazine no. 3", 1987, which permit a maximum reduction of the solid material and at the same time have a high stability. The particular feature of this sandwich structure is a fine network structure with interconnecting webs, assemblage points and a large number of open interstices in the core. The structure is obtained by shaping a textile web hardened with synthetic resin.

The structural honeycomb is a special shape of the textile starting material for use as a core in sandwich constructions. A textile fabric with a mesh structure, impregnated with synthetic resin, is predried to give a semifinished product free from adhesive, known as the "prepreg", and shaped by deep drawing under the action of heat. Depending on the design of the mold, a structural honeycomb is obtained which has steps with a circular or hexagonal cross-section, webs or any other geometrical shape.

If two thin, load-bearing facings are bonded to a lightweight core to form a sandwich structure, weight-related strengths are obtained which can be many times greater than the values for steel.

Known core materials are foams and materials with a honeycomb structure, called honeycombs.

The strength, load-bearing capacity and torsion resistance of a sandwich construction depend essentially on the strength of the bond between facing and core.

When honeycombs are used as the core, problems arise in connection with the strength and load-bearing capacity, because only the thin webs of the honeycomb walls perpendicular to the facing act as the bonding surface. To produce high-strength bonds, it is therefore necessary to use costly bonding processes with expensive adhesive films. The strength and rigidity of these cores normally increases with their density.

The sandwich cores are bonded to the facings using a wide variety of film-type liquid and/or pasty adhesives. The amount of adhesive used is conventionally 150 to about 300 $g/m^2$ per bonding surface.

When cores are bonded to facings, their compressive strength and compressive rigidity normally increase relative to the unbonded state. For example, the compressive strength of honeycombs made of phenolic resin reinforced with aramide fibers increases by a factor of 1.2 when they are bonded to facings. In the case of structural honeycombs made of polyester fibers impregnated with phenolic resin, the compressive strength increases by a factor of about 1.1 to 1.4.

The object of the present invention was to improve the strength parameters of sandwich cores, especially structural honeycombs, by means of an improved bonding process, without thereby increasing the amount of adhesive relative to the state of the art.

The above-mentioned object is achieved by means of a process for the manufacture of composites from cores and facings by bonding the cores to the facings with a liquid and/or pasty adhesive, wherein the core is wetted with a liquid which also serves as a solvent and/or wetting agent for the adhesive.

Within the framework of the present invention as well as in the state of the art, an epoxy resin is used in combination with an epoxy hardener for the bonding preferably of structural honeycombs. When the amount of adhesive used is 300 $g/m^2$ on the crests of the honeycomb and 200 $g/m^2$ on the base of the structural honeycomb, the compressive strength increases by a factor of 1.4 relative to the unbonded state.

Surprisingly, it has been established that the compressive and shear strength as well as the compressive and shear modulus of the cores used according to the invention can be improved by a factor of substantially more than 1.4 if the cores are wetted, a few minutes before bonding, with a liquid which also serves as a solvent and/or wetting agent for the adhesive.

It has been possible to establish that a moistening of the cores can be observed due to the addition of the wetting liquid. In the case of structural honeycombs in particular, it has been possible to establish that the adhesive climbs up the side of the honeycombs and additionally strengthens the latter after curing. Without wetting, the adhesive does not climb up the side. The compressive and shear strength of lightweight building elements can also be increased by using special hydrophilic hardeners familiar to those skilled in the art. It is known that relatively light-resistant and relatively chemical-resistant coatings can be produced using certain epoxy resin hardeners, for example Beckopox® special hardener VEH 14, in combination with solventless epoxy resins. This particular hardener is a modified low-viscosity polyamine whose addition is known to improve the adhesion of epoxy resins to moist mineral substrates and also to render epoxy resins suitable for coating under water.

The present invention therefore makes it possible, with all liquid and/or pasty adhesives, substantially to strengthen the cores by moistening them, before bonding, with a liquid which thoroughly wets both the cores and the adhesive and thereby promotes the wetting of the cores by the adhesive. Wetting with a liquid which acts as a solvent for the adhesive promotes this effect especially in the case of high-viscosity or thixotropic adhesives.

In a preferred embodiment of the present invention, an air-permeable material is used as the core of the composite. Said material is preferably a material consisting of a textile fabric with a mesh structure which has been impregnated with resin and shaped in three dimensions.

The particular strength of the textile fabrics or warp-knitted fabrics is obtained by means of a fine network structure with interconnecting webs, assemblage points and a large number of air-filled cavities. This structure is obtained by shaping a textile web and hardening it with synthetic resin. Depending on the design of the mold, a structural honeycomb is obtained which has steps with a circular or hexagonal cross-section, webs or any other geometrical shape. The structural honeycombs produced in this way are distinguished by a number of special features: low density of down to about 10 $kg/m^3$, high heat stability, high specific shear strength, high wet strength, corrosion resistance, air permeability and flexibility, since the material can be rolled and can be shaped in three dimensions.

In a particular embodiment of the present invention, melamine resins and/or phenolic resins are used as impregnating agents for the textile fabrics or warp-knitted fabrics. Such materials are known to those skilled in the art. For example, it is extremely advantageous to combine the polyester fiber Treviera® with the phenolic resin Phenodur® order to produce such network structures. In this way, phenolic resins used as binders meet the high demands made on the heat stability.

While basically all known adhesives can be used to produce the bond between core and facing, it is preferred, according to a preferred embodiment of the present invention, to use epoxy resins as the adhesive in combination with modified polyamines as the hardener.

Particularly strong bonds are achieved in this case.

In a preferred embodiment of the present invention, water, acetone, special petroleum ether 100/140, xylene, methyl ethyl ketone, methyl isobutyl ketone, methyl glycol acetate, ethyl glycol acetate, methyl glycol, ethyl glycol, ethanol, butanol and/or i-propanol are used as the solvent and/or wetting agent. A decisive factor in choosing the solvent and/or wetting agent is the compatibility with the core and the resin applied thereto, on the one hand, and with the facing, on the other.

The cores can be brought into contact with the solvents and/or wetting agents in a wide variety of ways. For example, it has been found advantageous to moisten the cores with the solvent and/or wetting agent a few minutes before bonding. Another possible way of bringing the solvents and/or wetting agents into contact with the cores is to bring a solution and/or emulsion of the adhesive into direct contact with the cores.

Acetone and water may be singled out in particular among the above-mentioned solvents and/or wetting agents, the use of water being especially preferred in terms of the present invention.

When water is used, surface-active compounds are added. Such surfactants are known in the broadest sense to those skilled in the art and can be found for example in Ullmanns Encyclopädie der technischen Chemie (Ullmann's Encyclopedia of Industrial Chemistry), 4th edition, volume 22, pages 455–515.

As regards safety and hygiene at work, moistening the cores with an aqueous solution of wetting agent represents a particularly advantageous embodiment for ecological reasons.

An especially preferred embodiment of the present invention consists in using 0.1 to 5% by weight of surface-active compound in water and a more preferable embodiment consists in using 1 to 3% by weight.

Although it is preferred to use structural honeycombs, they are not the only sandwich cores whose strength properties can be increased. Thus, for example, when the process is applied to the bonding of perforated paper honeycomb cores with a thickness of up to 15 mm, the strength can be increased if the surface condition of the honeycombs enables the adhesive to spread well over the side of the honeycombs and if the perforation allows the cores to dry out completely after bonding.

Furthermore, an increase in strength is also observed in the case of air-impermeable sandwich cores, for example non-perforated honeycombs, if at least one of the sandwich facings is air-permeable and hence suitable for allowing the solvent and/or wetting agent to pass through.

EXAMPLE 1

A polyester knitted fabric weighing 120 g/m² was impregnated with a commercially available melamine resin and shaped into a network structure with a thickness of 8.4 mm, forming a structural honeycomb having steps with a circular cross-section. The density of this structural building element was 36 kg/m³.

The above-mentioned structural honeycomb was bonded to a facing made of an unplasticized impact-resistant rigid PVC (Hostalit Z). The adhesive used was the epoxy resin Beckopox® EP 128, i.e. an unmodified medium-viscosity to low-viscosity epoxy resin with a dynamic viscosity according to DIN 53 015 of ca. 1000 mPa.s at 23° C., an epoxide equivalent according to DIN 53 188 of 190 to 210, an epoxide number of 0.48 to 0.53 and a density of 1.12 at 25° C.

Before bonding, the structural honeycomb was immersed for 0.5 min in an aqueous solution of wetting agent containing 2% by weight of a commercially available anionic surfactant.

After drying, the composite had a compressive strength of 0.77N/mm² and a compressive modulus of 35.4N/mm².

Comparative Example 1

An identical composite was produced using the knitted fabric mentioned in Example 1, but without wetting the structural honeycombs.

The resulting composite had a compressive strength of 0.34 and a compressive modulus of 18.7.

EXAMPLE 2

A polyester knitted fabric weighing 70 g/m² was impregnated with a phenolic resin and shaped to give a thickness of 7.5 mm according to Example 1. The structural honeycomb had a density of 24 kg/m³. After the structural honeycomb had been immersed for 0.5 min in an aqueous solution of wetting agent containing 2% by weight of a commercially available anionic surfactant, a composite was produced according to Example 1.

Using the same adhesive as in Example 1, a compressive strength of 0.53N/mm² and a compressive modulus of 11.9N/mm² were obtained.

Comparative Example 2

Using a polyester knitted fabric according to Example 2, a composite was produced by following the same procedure, but without wetting.

This resulted in a compressive strength of 0.12N/mm² and a compressive modulus of 7.6N/mm².

What is claimed is:

1. A process for the manufacture of a composite from a core and a facing by bonding a core to a facing with a liquid and/or pasty adhesive, wherein the core is wetted with a liquid which also serves as a solvent and/or wetting agent for the adhesive and wherein said core is an impregnated warp-knitted fabric or textile fabric with a mesh structure, shaped in three dimensions.

2. A process as claimed in claim 1, wherein said textile fabric has a network structure with interconnecting webs, assemblage points and a large number of open interstices.

3. A process as claimed in claim 1, wherein a melamine resin and/or a phenolic resin is used as an impregnating agent for the textile fabric or warp-knitted fabric.

4. A process for the manufacture of a composite from a core and a facing by bonding a core to a facing with a liquid and/or pasty adhesive, wherein the core is wetted with a liquid which also serves as a solvent and/or wetting agent for the adhesive and wherein said core is an air-permeable material, and said adhesive is an epoxy resin in combination with a modified polyamine hardener.

5. A process for the manufacture of a composite from a core and a facing by bonding a core to a facing with a liquid and/or pasty adhesive, wherein the core is wetted with a liquid which also serves as a solvent and/or wetting agent for the adhesive and wherein said core is an air-permeable material, and said solvent and/or wetting agent is water, acetone, special petroleum ether 100/140, xylene, methyl ethyl ketone, methyl isobutyl ketone, methyl glycol acetate, ethyl glycol acetate, methyl glycol, ethyl glycol, ethanol, butanol, i-propanol and/or a mixture thereof.

6. A process as claimed in claim 5, wherein the solvent employed is water and wherein said water is used together with a surface-active compound.

7. A process as claimed in claim 6, wherein 0.1 to 5% by weight aqueous solution containing a surface-active compound is used.

8. A process as claimed in claim 6, wherein 1 to 3% by weight aqueous solution containing a surface-active compound is used.

* * * * *